Nov. 7, 1967  E. F. LAMBERT  3,350,878
CARBON MONOXIDE BURNER FOR AUTOMOBILE EXHAUST
Filed March 21, 1966
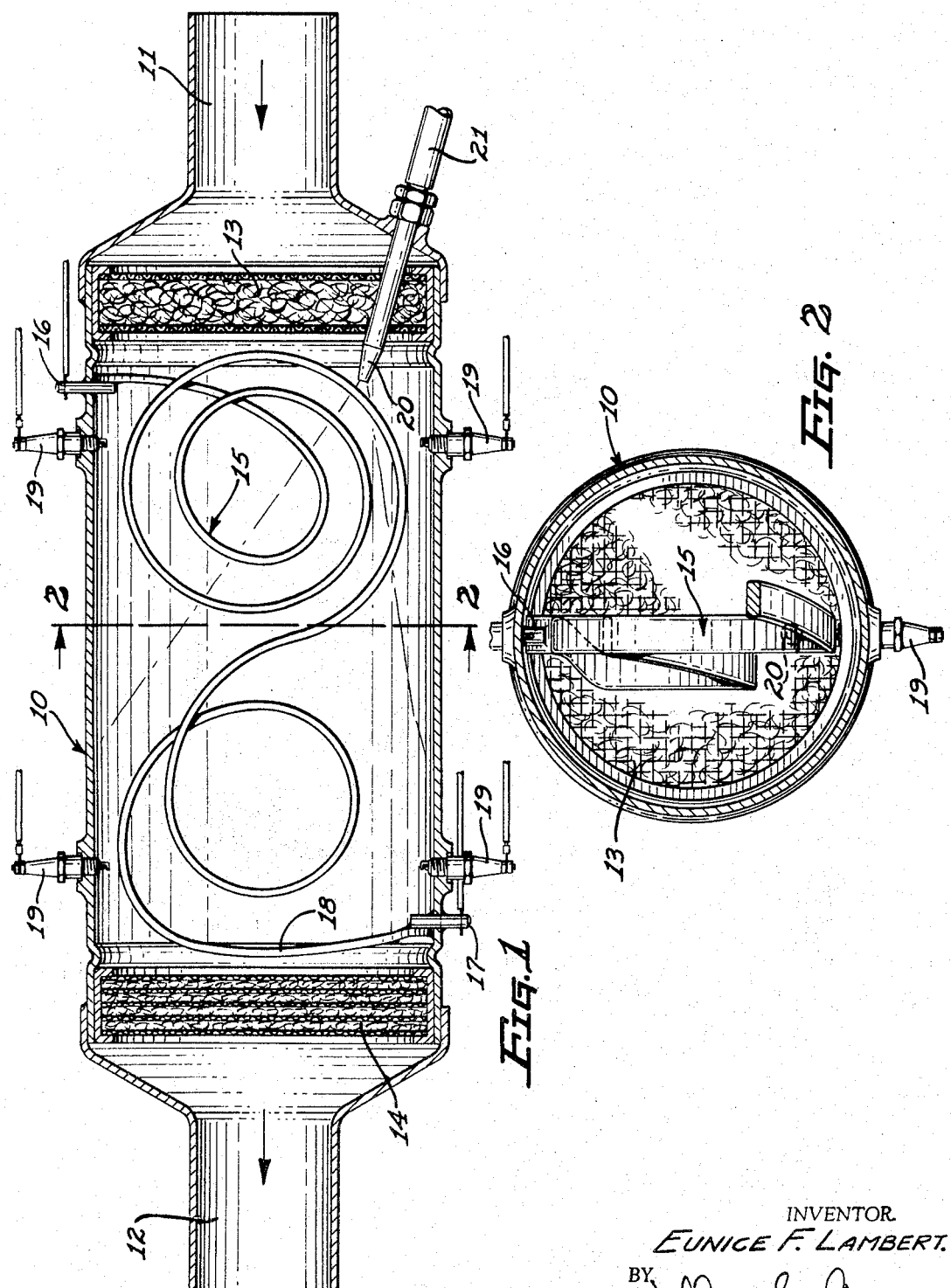
INVENTOR.
EUNICE F. LAMBERT.
BY
ATTORNEY.

United States Patent Office 3,350,878
Patented Nov. 7, 1967

3,350,878
CARBON MONOXIDE BURNER FOR AUTOMOBILE EXHAUST
Eunice F. Lambert, 65 W. Encanto Blvd., Phoenix, Ariz. 85003
Filed Mar. 21, 1966, Ser. No. 535,772
2 Claims. (Cl. 60—30)

This invention pertains to devices for reducing air pollution from automobile engine exhaust and discharges of similar nature from internal combustion engines and is particularly directed to an improved carbon monoxide burner for automobile exhausts.

One of the objects of this invention is to provide a device which may be readily carried by a vehicle and adapted to receive the exhaust from the internal combustion engine thereof and to substantially reduce the harmful air pollution producing materials from such engines.

Still another object of this invention is to provide a carbon monoxide burner for an automobile engine exhaust which is compact, light in weight, and highly efficient and effective in operation.

Still another object of this invention is to provide an air pollution control device for an automobile exhaust that is energized from the electrical system of the motor vehicle.

Further features and advantages of this invention will appear from a detailed description of the drawings in which:

FIG. 1 is a sectional view through a carbon monoxide burner for an internal combustion engine incorporating the features of this invention.

FIG. 2 is an enlarged sectional view on the line 2—2 of FIG. 1.

As an example of one embodiment of this invention, there is shown a carbon monoxide burner comprising an enlarged cylindrical housing 10 having a reduced intake end 11 connected to the exhaust pipe of an internal combustion engine and a reduced outlet end 12 connected to the tail pipe discharge of the engine. A check baffle 13 is secured in the housing 10 adjacent the intake end 11 to reduce and distribute the flow through the housing 10. A heat exchanger baffle 14 is fixed at the opposite end of the housing 10 adjacent the outlet end 12.

Intermediate the baffles 13 and 14 in the housing 10 is located a suitable heating coil 15 having terminals 16 and 17 connected to the electrical system of the motor vehicle. A portion 18 of the heating coil 15 is provided close to the baffle 14 for heating the same as the gasses pass through the baffle 14 into the outlet end 12. Sparkplugs 19 are mounted in and project through the housing 10 and are suitably continuously energized from a source of high potential electricity. An air jet 20 extends through the baffle 13 into the space occupied by the heating coil 15 in the housing 10 which is supplied by a suitable source of air pressure from the supply line 21.

In operation the spark plugs 19 are continuously energized and the coil 15 energized to incandescence as the exhaust from the engine enters through the baffle 13. The other baffle 14 is heated to high temperature from the portion 18 of the coil 15. Oxygen from the jet 20 is added and forced downstream into the chamber within the housing 10 so as to oxidize the carbon monoxide in the presence of the heating coil 15 and sparkplugs to carbon dioxide which is then discharged from the outlet end 12 into atmosphere in a harmless manner to avoid air pollution.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A carbon monoxide burner for the exhaust of an internal combustion engine comprising in combination:
   (a) an enlarged cylindrical housing,
   (b) a reduced intake opening at one end of said housing,
   (c) a reduced outlet opening at the other end of said housing,
   (d) a check baffle within said housing adjacent said intake opening,
   (e) a heat exchange baffle within said housing adjacent said outlet opening,
   (f) a heating coil in said housing located between said baffles,
   (g) a plurality of spark plugs having their active points within said housing between said baffles, and
   (h) air jet means on said housing discharging downstream within the area between said baffles.

2. In a carbon monoxide burner as set forth in claim 1 wherein said heating coil has a portion arranged to heat said heat exchange baffle at the outlet end of said housing.

References Cited

UNITED STATES PATENTS

| 1,756,897 | 4/1930 | Bilsky | 60—30 |
| 3,146,072 | 8/1964 | Morgan | 60—30 X |

RALPH D. BLAKESLEE, *Primary Examiner.*